United States Patent
Lee et al.

(10) Patent No.: US 10,667,243 B2
(45) Date of Patent: May 26, 2020

(54) METHODS FOR TRANSMITTING AND RECEIVING REFERENCE SIGNALS IN WIRELESS COMMUNICATION SYSTEM, AND DEVICES FOR SAME

(71) Applicant: LG ELECTRONICS INC., Seoul (KR)

(72) Inventors: Sangrim Lee, Seoul (KR); Hojae Lee, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/777,635

(22) PCT Filed: Aug. 10, 2016

(86) PCT No.: PCT/KR2016/008790
§ 371 (c)(1),
(2) Date: May 18, 2018

(87) PCT Pub. No.: WO2017/086574
PCT Pub. Date: May 26, 2017

(65) Prior Publication Data
US 2018/0352540 A1 Dec. 6, 2018

Related U.S. Application Data

(60) Provisional application No. 62/257,200, filed on Nov. 18, 2015, provisional application No. 62/295,153, filed on Feb. 15, 2016.

(51) Int. Cl.
*H04W 72/04* (2009.01)
*H04L 27/26* (2006.01)
*H04L 5/00* (2006.01)

(52) U.S. Cl.
CPC ....... *H04W 72/0406* (2013.01); *H04L 5/0048* (2013.01); *H04L 27/2613* (2013.01); *H04L 5/0053* (2013.01)

(58) Field of Classification Search
None
See application file for complete search history.

(56) References Cited

U.S. PATENT DOCUMENTS

2011/0281607 A1* 11/2011 Wu ............. H04L 5/0023
455/509
2013/0072241 A1* 3/2013 Sorrentino ......... H04L 25/0224
455/501

(Continued)

FOREIGN PATENT DOCUMENTS

| KR | 1020110107828 | | 10/2011 | |
| KR | WO2013165206 | * | 7/2013 | ............ H04B 7/26 |
| KR | 1020150013444 | | 2/2015 | |

OTHER PUBLICATIONS

PCT International Application No. PCT/KR2016/008790 Written Opinion of the International Searching Authority dated Dec. 2, 2016, 20 pages.

*Primary Examiner* — Thinh D Tran
(74) *Attorney, Agent, or Firm* — Lee Hong Degerman Kang Waimey

(57) ABSTRACT

This method for a transmitting side to transmit reference signals in a wireless communication system may comprise the step of: generating first reference signals for the demodulation of control channels and second reference signals for the demodulation of data channels; overlapping mapping the first and second reference signals to resources to which the control channels have been allocated in a predefined subframe; and transmitting the first and second reference signals mapped to the resources to which the control channels have been allocated.

14 Claims, 17 Drawing Sheets

(56) References Cited

U.S. PATENT DOCUMENTS

| | | | |
|---|---|---|---|
| 2015/0085785 A1* | 3/2015 | Kim | H04L 5/0092 |
| | | | 370/329 |
| 2015/0092768 A1 | 4/2015 | Ng et al. | |
| 2015/0222402 A1* | 8/2015 | Ouchi | H04L 1/00 |
| | | | 370/329 |
| 2017/0041119 A1* | 2/2017 | Ang | H04L 5/0028 |
| 2017/0063514 A1* | 3/2017 | Chen | H04L 5/14 |
| 2018/0262305 A1* | 9/2018 | Zhang | H04L 5/1469 |

* cited by examiner

<DL data case>

METHODS FOR TRANSMITTING AND RECEIVING REFERENCE SIGNALS IN WIRELESS COMMUNICATION SYSTEM, AND DEVICES FOR SAME

CROSS-REFERENCE TO RELATED APPLICATIONS

This application is the National Stage filing under 35 U.S.C. 371 of International Application No. PCT/KR2016/008790, filed on Aug. 10, 2016, which claims the benefit of U.S. Provisional Application No. 62/257,200, filed on Nov. 18, 2015 and 62/295,153, filed on Feb. 15, 2016, the contents of which are all hereby incorporated by reference herein in their entirety.

TECHNICAL FIELD

The present invention relates to a wireless communication system, and more particularly, to a method of transmitting and receiving a reference signal in a wireless communication system and an apparatus therefor.

BACKGROUND ART

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

However, the legacy frame structure of 1 ms TTI is unable to satisfy the 1 ms data requirement latency. 5G aims to provide data latency reduced as much as 10 times compared to the legacy data latency.

Although 5G communication system requires a new frame structure to solve the abovementioned problem, the new frame structure has not been proposed yet.

DISCLOSURE OF THE INVENTION

Technical Tasks

A technical task of the present invention is to provide a method for a transmitting side to transmit a reference signal in a wireless communication system.

Another technical task of the present invention is to provide a method for a receiving side to receive a reference signal in a wireless communication system.

Another technical task of the present invention is to provide a transmission device for transmitting a reference signal in a wireless communication system.

The other technical task of the present invention is to provide a reception device for receiving a reference signal in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a reference signal, by a transmitting side, in a wireless communication system, includes generating first reference signals for demodulating a control channel and second reference signals for demodulating a data channel, mapping the first reference signals and the second reference signals to a resource of a predefined subframe to which a control channel is assigned by overlapping the first reference signals and the second reference signals, and transmitting the first reference signals and the second reference signals mapped to the resource to which the control channel is assigned. Predefined cyclic shift values can be applied to the first reference signals and the second reference signals. Different cyclic shift value can be applied to the first reference signals and the second reference signals. When two values have a greatest difference among predefined cyclic shift values, one of the two values is applied to the first reference signals and another can be applied to the second reference signals. The resource to which the control channel is assigned can include a first symbol, a second symbol, a fourth symbol, or a immediately preceding symbol of a last symbol in the predefined subframe. The mapping may further include mapping the first reference signals and the second reference signals to whole band of the resource to which the control channel is assigned.

To further achieve these and other advantages and in accordance with the purpose of the present invention, according to a different embodiment, a method of receiving a reference signal, by a receiving side, in a wireless communication system, includes receiving first reference signals for demodulating a control channel and second reference signals for demodulating a data channel in a resource to which a control channel is assigned, detecting control information using the first reference signals, and detecting data using the control information and the second reference signals. The first reference signals and the second reference signals can be received in a manner of being overlapped and mapped to the resource to which the control channel is assigned. The first reference signals and the second reference signals can be received in a manner of being mapped to whole band of the resource to which the control channel is assigned. Predefined cyclic shift values can be applied to the first reference signals and the second reference signals. Different cyclic shift value can be applied to the first reference signals and the second reference signals. When two values have a greatest difference among predefined cyclic shift values, one of the two values is applied to the first reference signals and another can be applied to the second reference signals. The resource to which the control channel is assigned can include a first symbol, a second symbol, a fourth symbol, or a immediately preceding symbol of last symbol in the predefined subframe.

To further achieve these and other advantages and in accordance with the purpose of the present invention, according to a further different embodiment, a transmitting apparatus for transmitting a reference signal in a wireless communication system includes a processor configured to generate first reference signals for demodulating a control channel and second reference signals for demodulating a data channel, the processor configured to map the first reference signals and the second reference signals to a resource of a predefined subframe to which a control channel is assigned by overlapping the first reference signals and the second reference signals, and a transmitter configured to transmit the first reference signals and the second reference signals mapped to the resource to which the control channel is assigned.

To further achieve these and other advantages and in accordance with the purpose of the present invention, according to a further different embodiment, a receiving apparatus for receiving a reference signal in a wireless communication system includes a receiver configured to receive first reference signals for demodulating a control channel and second reference signals for demodulating a data channel in a resource to which a control channel is assigned, and a processor configured to detect control information using the first reference signals, the processor configured to detect data using the control information and the second reference signals.

Advantageous Effects

According to a frame structure provided by the present invention, it is able to achieve low latency (i.e., OTA (w/initiation)<1 ms) corresponding to 5G service requirement and provide DL/UL flexibility capable of efficiently supporting asymmetry of DL/UL traffic as much as possible.

According to one embodiment, it is able to reduce waste of RS resources for detecting a data channel and a control channel in a self-contained frame structure and reduce decoding latency.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Mode For Invention

Figure 1:
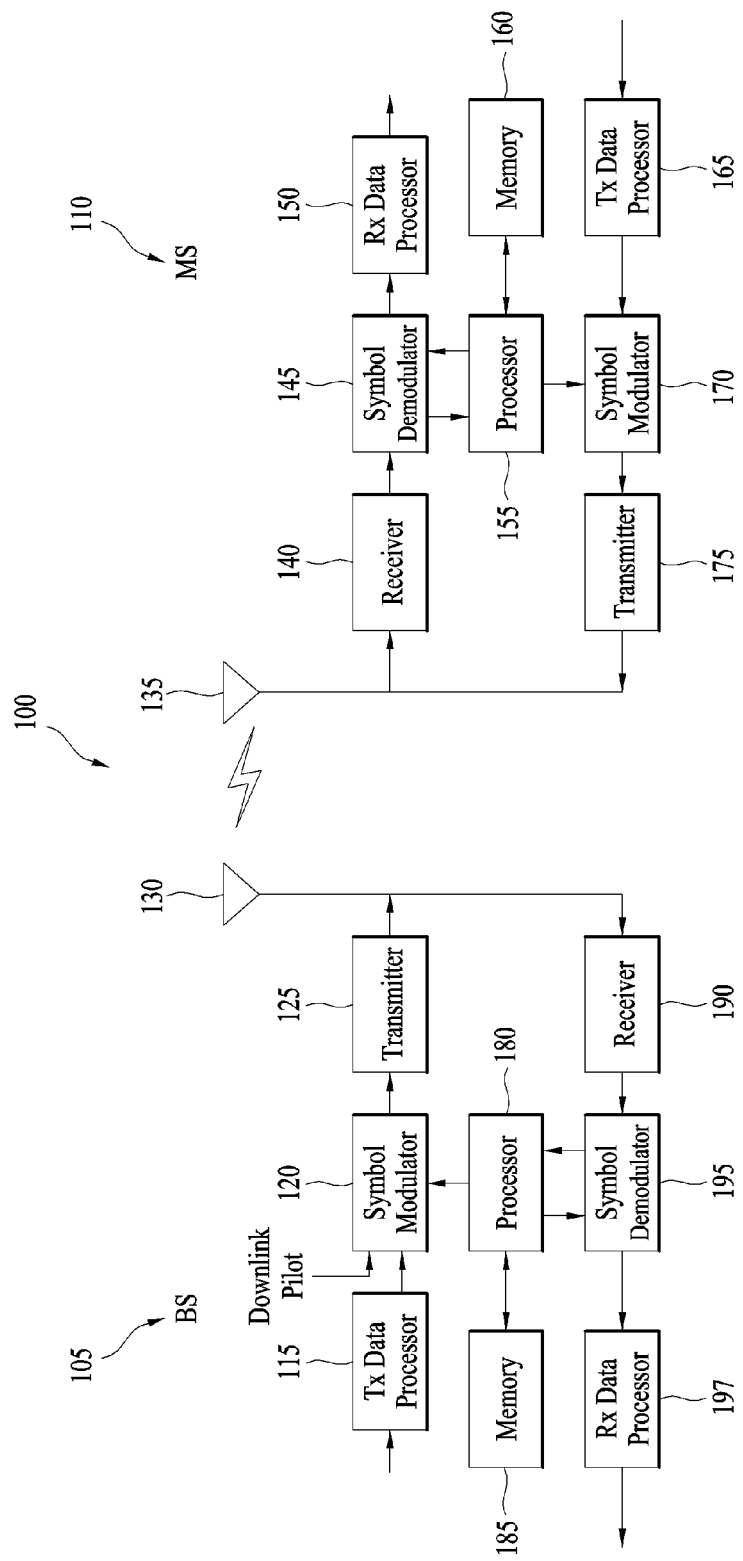
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

In case of performing wireless transmission between a base station and a UE, a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD).

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes new and various frame structures for a $5^{th}$ generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

Figure 2:
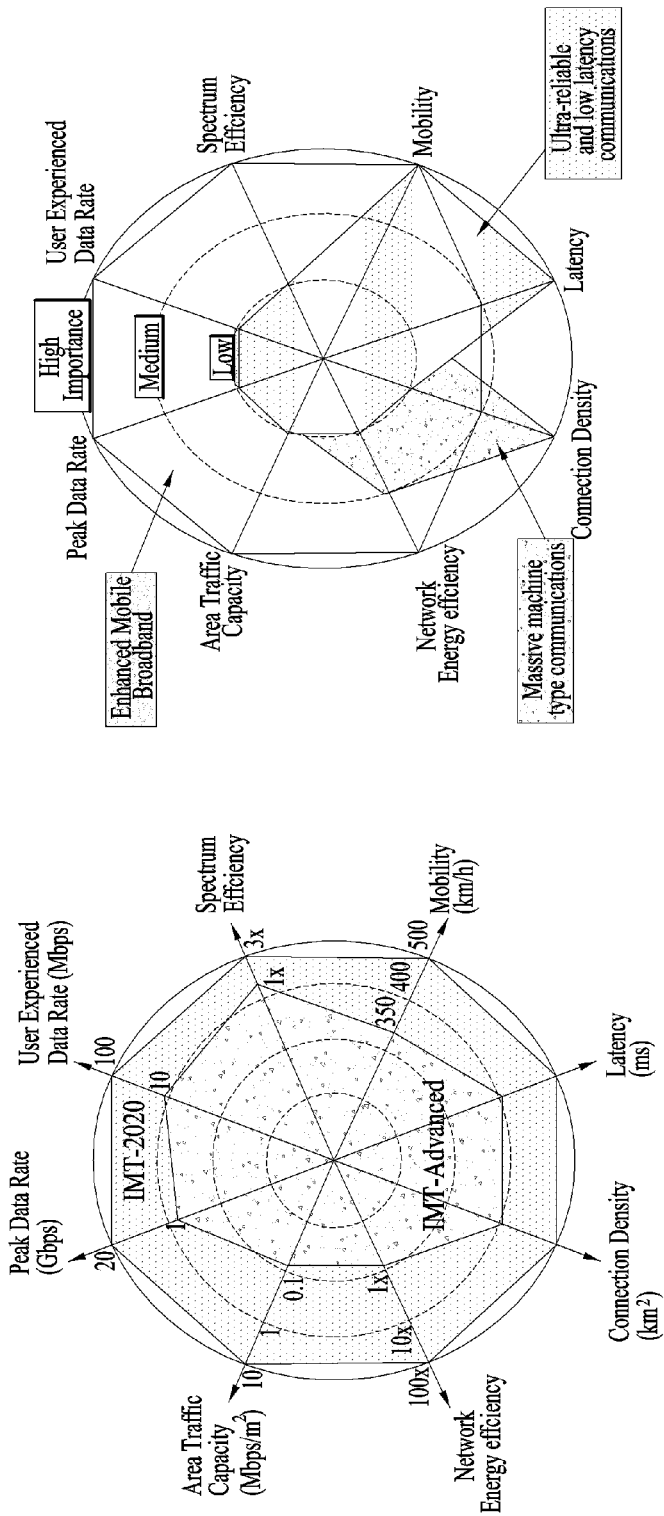
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 illustrates correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <$10^{-6}$).

Figure 3:
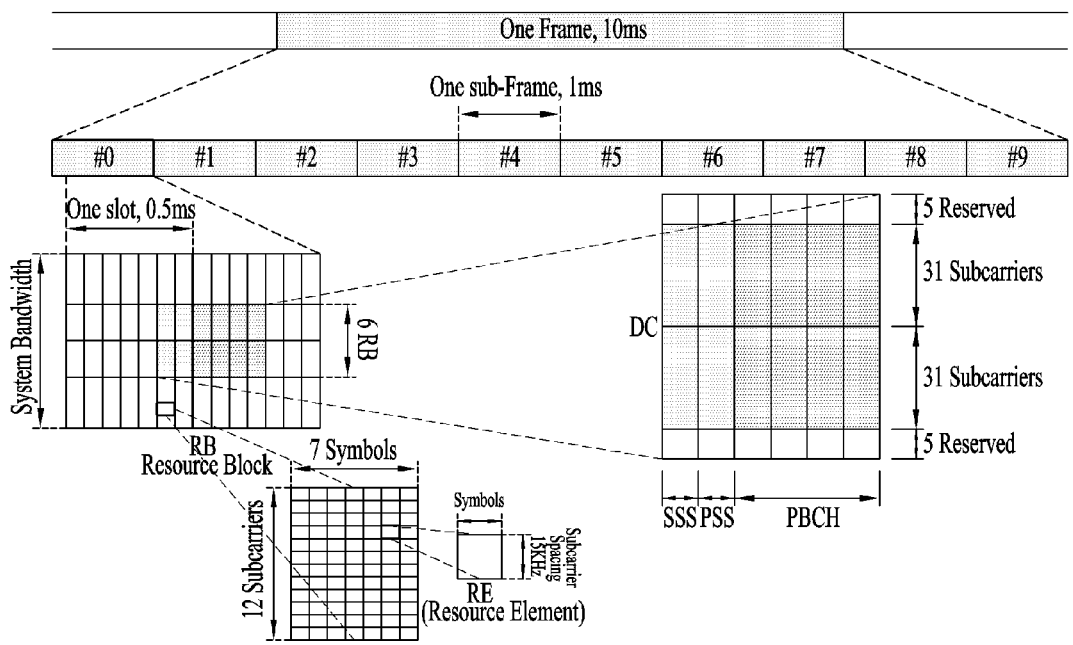
FIG. 3 is a diagram for LTE/LTE-A frame structure.

FIG. 3 is a diagram for LTE/LTE-A frame structure.

FIG. 3 shows a basic concept of a frame structure of LTE/LTE-A. One frame corresponds to 10 ms and includes 10 1-ms subframes. One subframe includes 2 0.5-ms slots and one slot includes 7 OFDM (Orthogonal Frequency Division Multiplexing) symbols. One resource block (RB) is defined by 12 subcarriers each of which has 15 kHz space and 7 OFDM symbols. A base station delivers a primary synchronization signal (PSS) and a secondary synchronization signal (SSS) for synchronization a physical broadcast channel (PBCH) for system information in a center frequency (6 RBs). In this case, it may have a difference in the frame structure and positions of the signal and the channel depending on a normal/extended CP (cyclic prefix) and TDD (Time Division Duplex)/FDD (Frequency Division Duplex).

Figure 4:
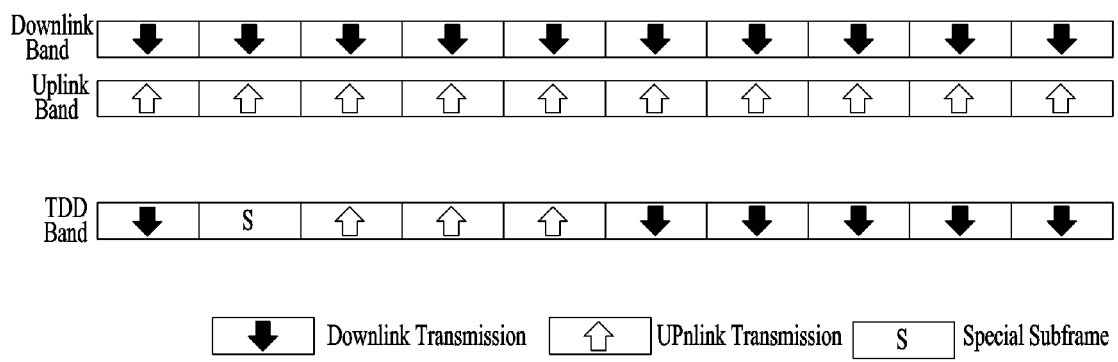
FIG. 4 is a diagram for an example of FDD/TDD frame structure in LTE/LTE-A system.

FIG. 4 is a diagram for an example of FDD/TDD frame structure in LTE/LTE-A system.

Referring to FIG. 4, in case of a FDD frame structure, a downlink frequency band is distinguished from an uplink frequency band. In case of a TDD frame structure, a downlink region is distinguished from an uplink region in a subframe unit in the same band.

Figure 5:
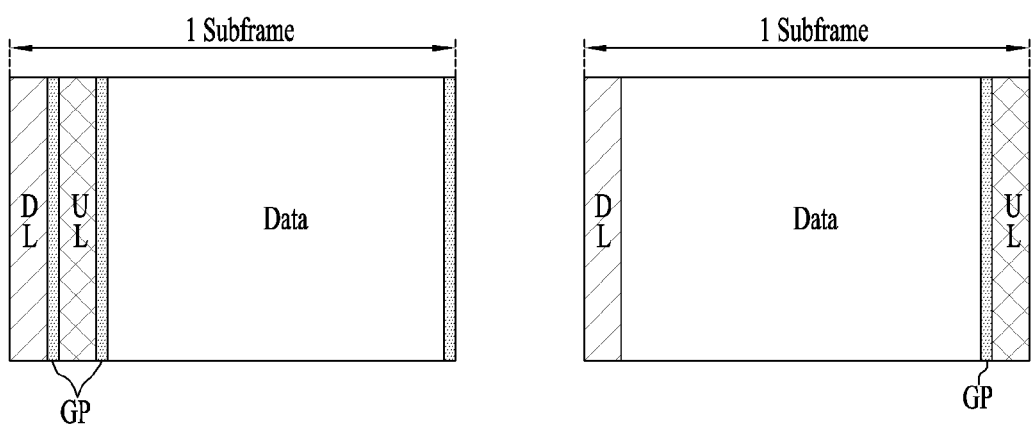
FIG. 5 is a diagram for an example of a self-contained subframe structure.

FIG. 5 is a diagram for an example of a self-contained subframe structure.

FIG. 5 illustrates a self-contained subframe structure which is proposed to satisfy a low-latency requirement among 5G performance requirements. A TDD-based self-contained subframe structure has a resource section for downlink, a resource section for uplink (e.g., a downlink control channel and an uplink control channel), a guard period (GP) for solving an interference issue between downlink and uplink, and a resource section for data transmission in a single subframe.

FIG. 5(*a*) shows an example of a self-contained subframe structure. A subframe is configured in an order of a resource section for downlink, a resource section for uplink, and a resource section for data and a GP exists between the resource sections. In FIG. 5(*a*), a downlink resource section represented as DL may correspond to a resource section for a downlink control channel and an uplink resource section represented as UL may correspond to a resource section for an uplink control channel.

FIG. 5(*b*) shows a different example of a self-contained subframe structure. A subframe is configured in an order of a resource section for downlink, a resource section for data, and a resource section for uplink and a GP exists prior to the resource section for uplink only. In FIG. 5(*b*), a downlink resource section represented as DL may correspond to a resource section for a downlink control channel and an uplink resource section represented as UL may correspond to a resource section for an uplink control channel.

The next generation 5G system is considering V2X targeting ultra-low latency, eMBB service targeting emergency service, machine control, and data speed, and the like. Hence, it is necessary to design a frame structure capable of supporting low latency (OTA<1 ms) and high degree of freedom of DL/UL data. And, it is necessary to design a commonality-based single frame structure which is not necessary to be redesigned in TDD or FDD operation scheme.

In order to provide the low latency and the degree of freedom of DL/UL data configuration in the next generation 5G system, the present invention proposes a method of configuring a new frame structure and a control zone. In the present specification, such a term as a zone indicates a resource. Such a terms as a region, a channel, and the like can be used together with the zone in the same meaning.

Proposal 1: New Frame Structure (Adaptive/Self-contained Frame Structure) for 5G Systems It is difficult to satisfy a requirement of OTA<1 ms in a current LTE/LTE-A TDD frame structure. And, although TDD scheme provides various TDD DL/UL configurations to efficiently support asymmetry (DL traffic>UL traffic) of DL/UL data amount, it causes a complex procedure for HARQ (hybrid automatic repeat request) ACK/NACK time depending on a TDD DL/UL configuration. In order to solve the problem, as shown in FIG. 5, self-contained frame structures provide an opportunity for transmitting ACK/NACK in every subframe by simultaneously configuring a DL control zone (or, a DL control channel, a DL control region) and an UL control zone in a single subframe.

Figure 6:
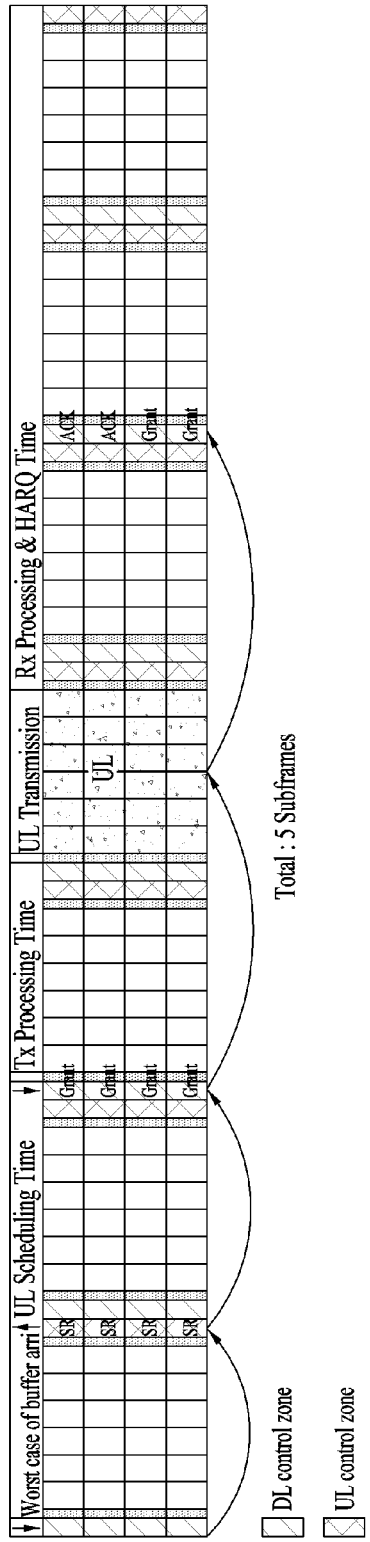
FIG. 6 is a diagram for a HARQ procedure when a UL resource of a data zone is immediately allocated.

FIG. 6 is a diagram for a HARQ procedure when a UL resource of a data zone is immediately allocated.

When a data zone is always guaranteed as an UL data zone or a DL data zone (or, DL data region) based on the subframe structure shown in FIG. 5(*b*), it may be able to perform a HARQ procedure within 5 subframes between OTA (w/initiation), i.e., UL buffer arrival, and final ACK/NACK reception.

FIG. 6 illustrates an example that HARQ ACK is received within 5 subframes. A corresponding procedure is described in the following. Subframe #1: if a data to be transmitted in UL is generated and a buffer arrival event is triggered, a UE transmits a scheduling request (SR) using an UL control zone. A subframe #2 corresponds to time for performing UL scheduling. A subframe #3 corresponds to a DL control zone. The UE receives a UL grant and prepares data to be transmitted in the subframe #3. The UE transmits UL data via a data zone in a subframe #4. A subframe #5 corresponds to time for a base station to receive data and perform Rx processing. The UE receives ACK via a DL control channel in a subframe #6.

According to the abovementioned procedure, from the timing at which the buffer arrival event occurred to the timing at which the ACK is received, it is able to see that the procedure occurs within 5 subframes. Hence, if TTI is configured by 0.2 ms, 'OTA (w/initiation)<1 ms' is satisfied. However, since a data zone is restricted to a UL data zone or a DL data zone in a single subframe, if DL (or UL) traffic considerably occurs, as shown in FIG. 7, it is apparent that a case of failing to transmit DL (or UL) traffic occurs.

Figure 7:
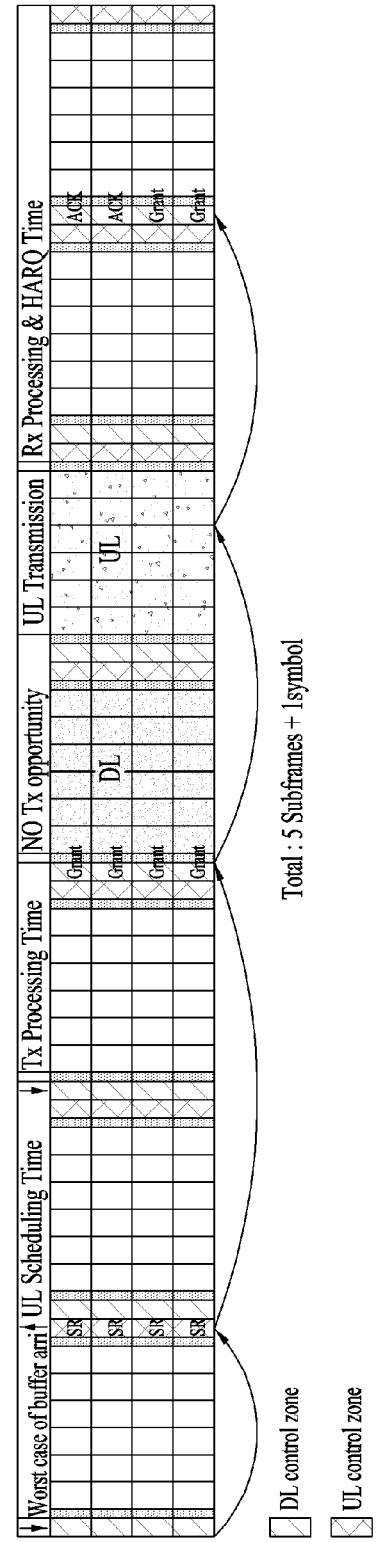
FIG. 7 is a diagram for a HARQ procedure when a UL resource of a data zone is not immediately allocated.

FIG. 7 is a diagram for a HARQ procedure when a UL resource of a data zone is not immediately allocated.

As shown in FIG. 7, if it fails to perform scheduling on UL data due to DL traffic for other UEs in a fourth subframe form the left side, latency as much as 1 subframe occurs and it is unable to satisfy 'OTA (w/initiation)<1 ms'. Moreover, if it is necessary to transmit more DL traffic, the latency is going to be extended. In particular, in order to achieve not only asymmetry of DL/UL traffic amount but also low latency, it is necessary to guarantee the degree of freedom of DL/UL traffic as much as possible in a data zone.

The present invention proposes a new frame structure capable of satisfying low latency and DL/UL data flexibility on the basis of a single carrier.

Proposal 1-1

Figure 8:
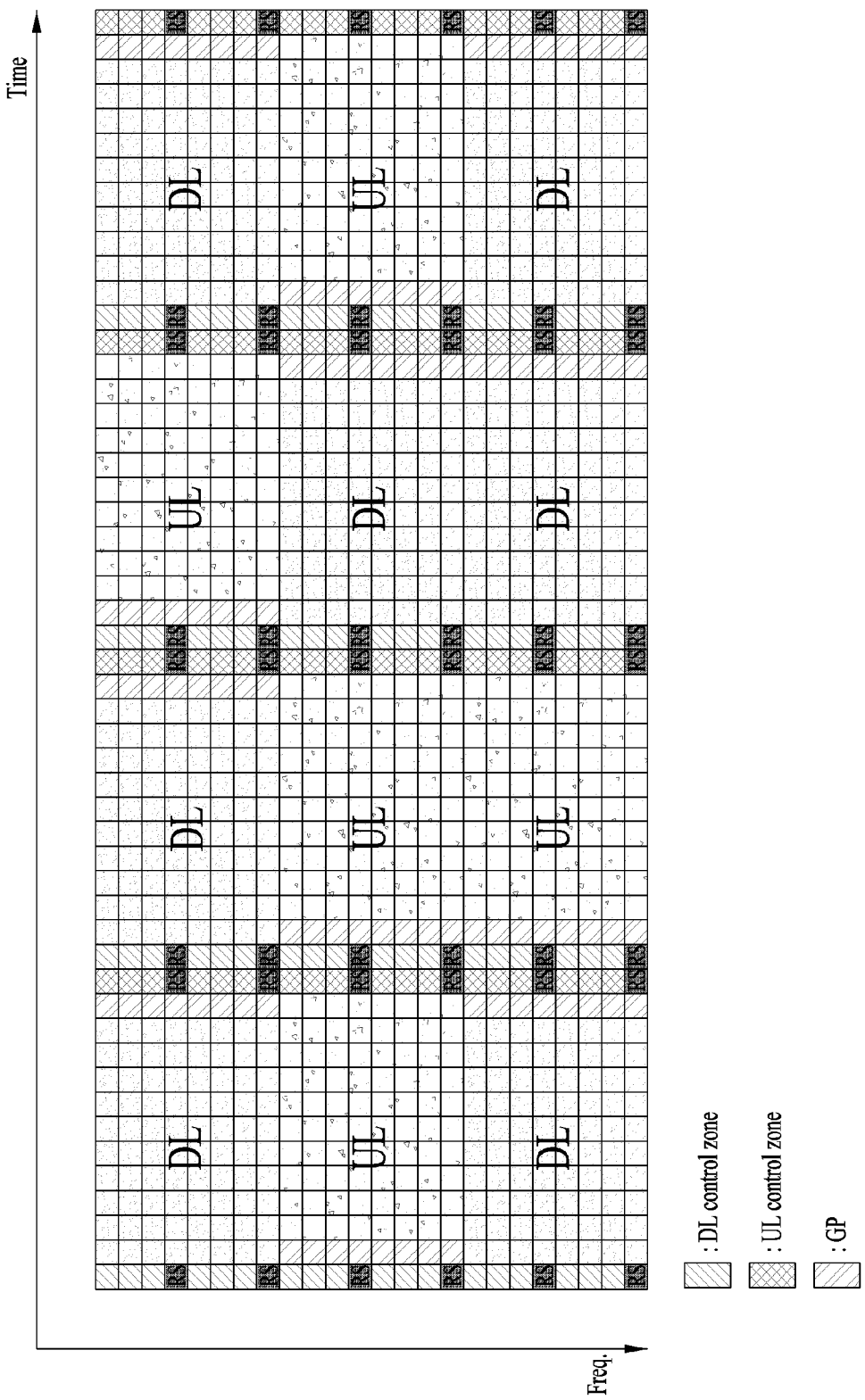
FIG. 8 is a diagram for a new frame structure according to a proposal 1-1 of the present invention.

FIG. 8 is a diagram for a new frame structure according to a proposal 1-1 of the present invention.

As shown in FIG. 8, a subframe is mainly divided into a DL control zone (or DL control channel), a GP, a data zone (data region or data channel), and a UL control zone (or UL control channel) on a single carrier. A frame structure shown in FIG. 8 corresponds to a frame structure which is configured under the assumption that a base station operates in a full duplex radio (FDR) scheme. Meanwhile, the frame structure shown in FIG. 8 may correspond to a frame structure allocated by a base station for a single UE. For example, if the frame structure shown in FIG. 8 corresponds to a frame structure allocated by a base station for a single UE, a DL data zone, a UL data zone, and a UL data zone are allocated to the UE according to a band in frequency domain direction in a first subframe shown in FIG. 8. In this case, the UE receives DL data from the base station on a band represented by DL and transmits UL data to the base station on a band represented by UL. In particular, the frame structure shown in FIG. 8 may correspond to a frame structure allocated to the UE under the assumption that the UE is able to operate in the FUR as well.

In FIG. 8, the DL data zone and the UL data zone, which are allocated according to a band in a subframe, can be differently configured according to a subframe. For example, referring to FIG. 8, a DL data zone, a UL data zone, and a UL data zone can be allocated according to a band in frequency domain direction in a second subframe.

As shown in FIG. 8, a DL control zone is located at the first (start) of a subframe in time domain, a data zone (a zone represented by DL, UL) is located right after the DL control zone, and a UL control zone is lastly located after the data zone. In this case, the data zone can be used as a DL data or a UL data in frequency domain without any restriction. And, a GP is located between the DL control zone and the data zone when data belonging to a corresponding band corresponds to UL. On the contrary, when data corresponds to DL, a GP is located between the data zone and the UL control zone.

As shown in FIG. 8, a UL transmission occasion and a DL transmission occasion exist at the same time in a data zone in every subframe. In particular, it is able to prevent additional latency due to the restriction of a legacy data zone restricted to DL or UL. If a length of a subframe is configured to be equal to or less than 0.2 ms, it is able to achieve 'OTA (w/initiation)<1 ms'.

Moreover, a base station may have more efficiency via DL/UL flexibility of the data zone in the aspect of utilizing DL/UL data resource compared to a legacy self-contained TDD frame structure. Hence, the frame structure shown in FIG. 8 is able to get rid of inefficiency due to the asymmetry of DL/UL traffic and achieve low latency.

Embodiment of Proposal 1-1

Embodiment for a method of achieving low latency and an operating method when DL data transmission timing is overlapped with UL data transmission timing are described in the following.

Figure 9:
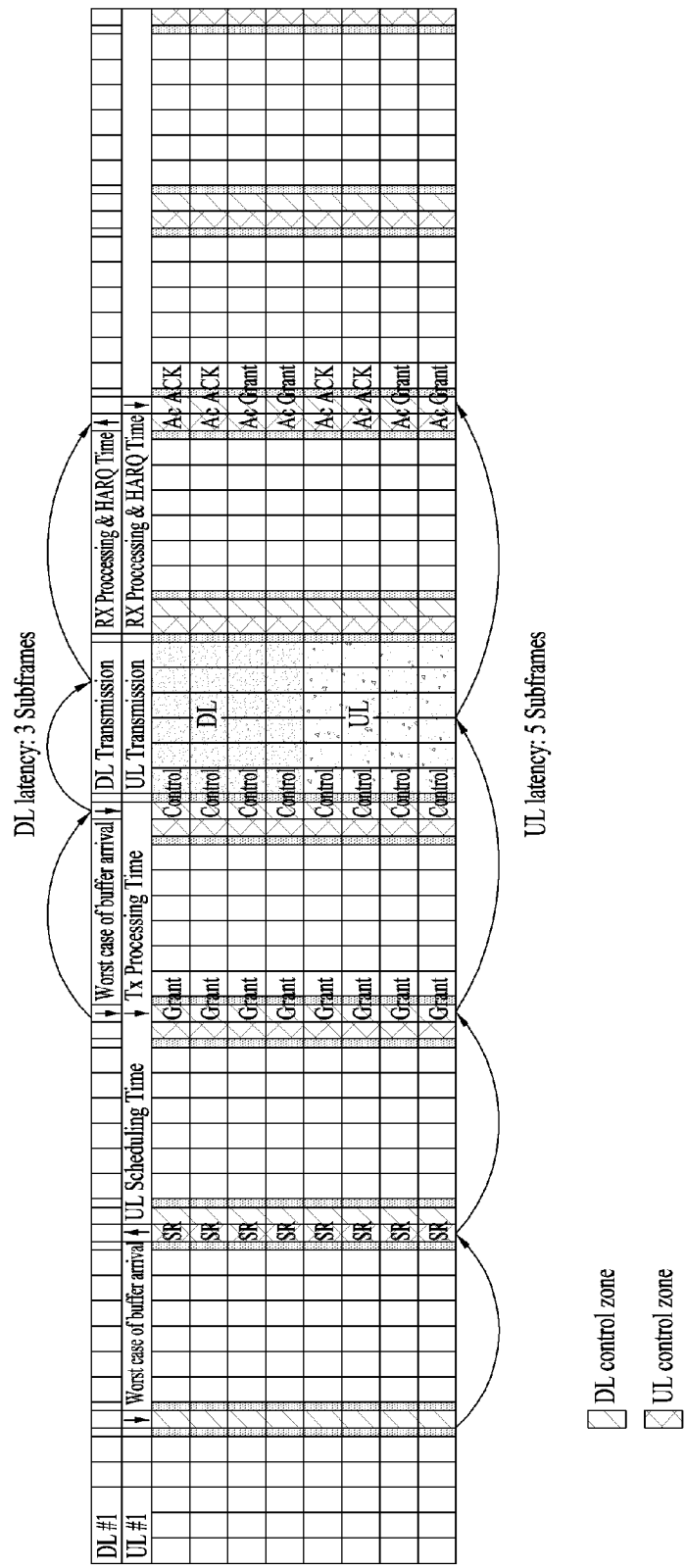
FIG. 9 is a diagram for explaining a case that DL transmission timing is overlapped with UL transmission timing.

FIG. 9 is a diagram for explaining a case that DL transmission timing is overlapped with UL transmission timing.

As shown in FIG. 9, when a DL buffer arrival event and a DL buffer arrival event respectively occur, one of the two buffer arrival events has no choice but to be delayed in a legacy frame structure. In FIG. 9, it is assumed that 2 traffics (DL traffic and UL traffic) are overlapped. If more traffic occurs at the same time, more latency may occur.

On the other hand, referring to a frame structure shown in FIG. 9, since a DL data zone and a UL data zone are allocated within a subframe, it is able to transmit DL data and UL data at the same time and simultaneous transmission is also supported while minimum latency is maintained. The frame structure shown in FIG. 9 has a merit in that a gain increases according to the increase of traffic.

Proposal 1-2

A DL control zone and a UL control zone can be configured by 1 to N number of symbols. A GP is configured by an integer multiple of a symbol. More specifically, a length of a GP can be configured by an integer multiple of a unit symbol allocated to a data zone.

In general, a length of a GP is designed by a round trip time (RTT) and RF switching time (from DL to UL/from UL to DL). Hence, the length of the GP can be determined by a method of minimizing overhead in consideration of RTT and RF switching time overhead (e.g., a self-contained frame structure).

If the frame structure shown in FIG. 8 corresponds to a frame structure allocated by a base station for a plurality of UEs, the base station operates in a full duplex scheme that performs UL/DL data transmission and reception at the same time in a data zone. On the contrary, The UEs operate in a half-duplex scheme that performs either transmission or reception only. Hence, it is necessary for the base station to transmit DL data and receive UL data at the same time. In this case, if GPs are configured according to a legacy method, as shown in FIG. 10, it is apparent that interference occurs due to the mismatch between symbol boundaries.

Figure 10:
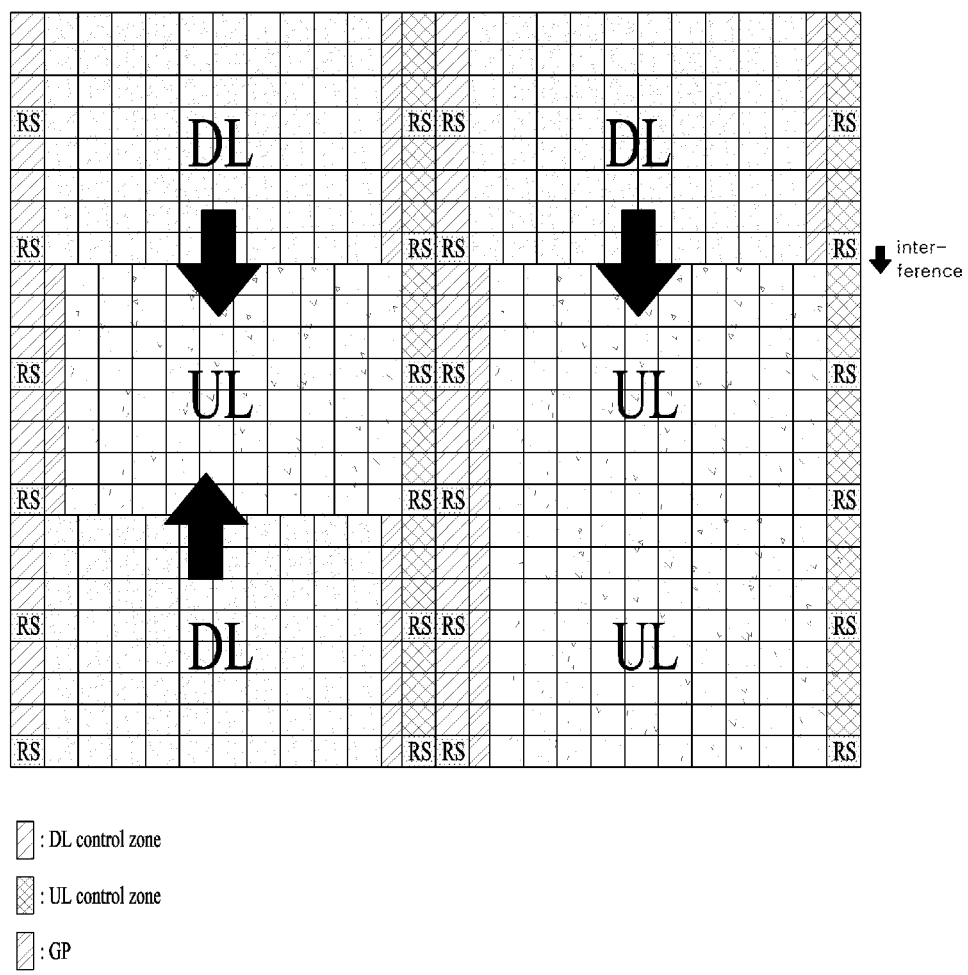
FIG. 10 is a diagram illustrating an example that a DL data symbol boundary is not matched with a UL data symbol boundary in a data zone in a base station.

FIG. 10 is a diagram illustrating an example that a DL data symbol boundary is not matched with a UL data symbol boundary in a data zone in a base station.

A base station receives data transmitted in DL within in-band. Hence, if a level of the mismatch is less than a CP length, it is able to receive UL data without interference on an ideal channel via orthogonality of OFDM. Yet, as shown in FIG. 10, a GP makes a symbol boundary between UL data and DL data to be mismatched. Hence, as shown in FIG. 8, it may be able to cancel the interference by configuring a GP length of a data zone by a symbol length.

In particular, the GP length of the data zone is configured to satisfy equation 1 in the following all the time by making the GP length to be an integer multiple of a length of a unit symbol that constructs the data zone.

Length of data zone÷Number of symbols in data zone=Length of single symbol=$T\_cp+T\_u$=GP length÷$k$  [Equation 1]

In this case, k is a natural number, T_cp corresponds to a CP length, and T_u corresponds to a length of a data part in a symbol. In particular, a length of a GP becomes an integer multiple of a length of a unit symbol that constructs a data zone.

And, a DL control zone and a UL control zone can be configured by N number of symbols without being restricted to a single symbol.

The frame structure shown in FIG. 10 requires a transceiver configured to perform DL and UL (i.e., transmission and reception) at the same time in a DL zone. A structure of the transceiver can be configured as follows.

Figure 11:
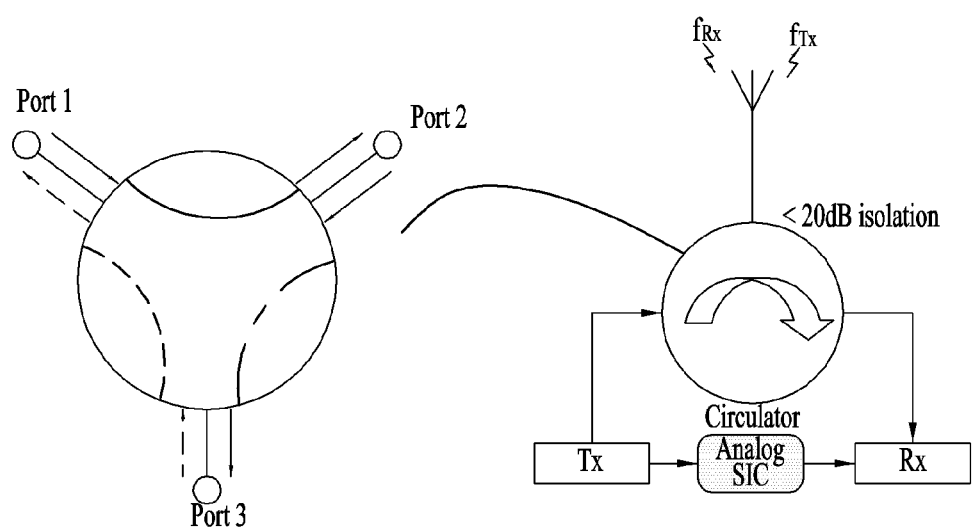
FIG. 11 is a diagram illustrating an example of an RF structure of a transceiver of a base station.

FIG. 11 is a diagram illustrating an example of an RF structure of a transceiver of a base station.

FIG. 11 illustrates configurations of devices for performing transmission and reception at the same time in a single carrier. First of all, in order to reduce power leakage that a signal transmitted by a base station is entering a receiving end, a signal is attenuated using a circulator. In addition, it may be able to additionally suppress a self-interference signal via an analog SIC device.

The frame structure proposed in the proposal 1 has the characteristic that transmission occasion of DL/UL traffic of FDD is always guaranteed in a legacy system. The frame structure can also efficiently use a resource according to asymmetry of DL/UL traffic of TDD.

In the following, a frame structure of a base station and a UE operating in a TDD or FDD mode is proposed.

Proposal 2-1

In a TDD carrier, a subframe is mainly divided into a DL control zone, a GP, a data zone, and a UL control zone. The DL control zone is located at the first of the subframe, the data zone is located right after the DL control zone, and the UL control zone is lastly located after the data zone. In this case, the data zone can be used as a DL data or a UL data in the subframe. And, a GP is located between the DL control zone and the data zone when data belonging to a corresponding band corresponds to UL. On the contrary, when data corresponds to DL data, a GP is located between the data zone and the UL control zone. The DL control zone and the UL control zone can be configured by 1 to N number of symbols. A GP is configured by an integer multiple of a symbol.

Figure 12:
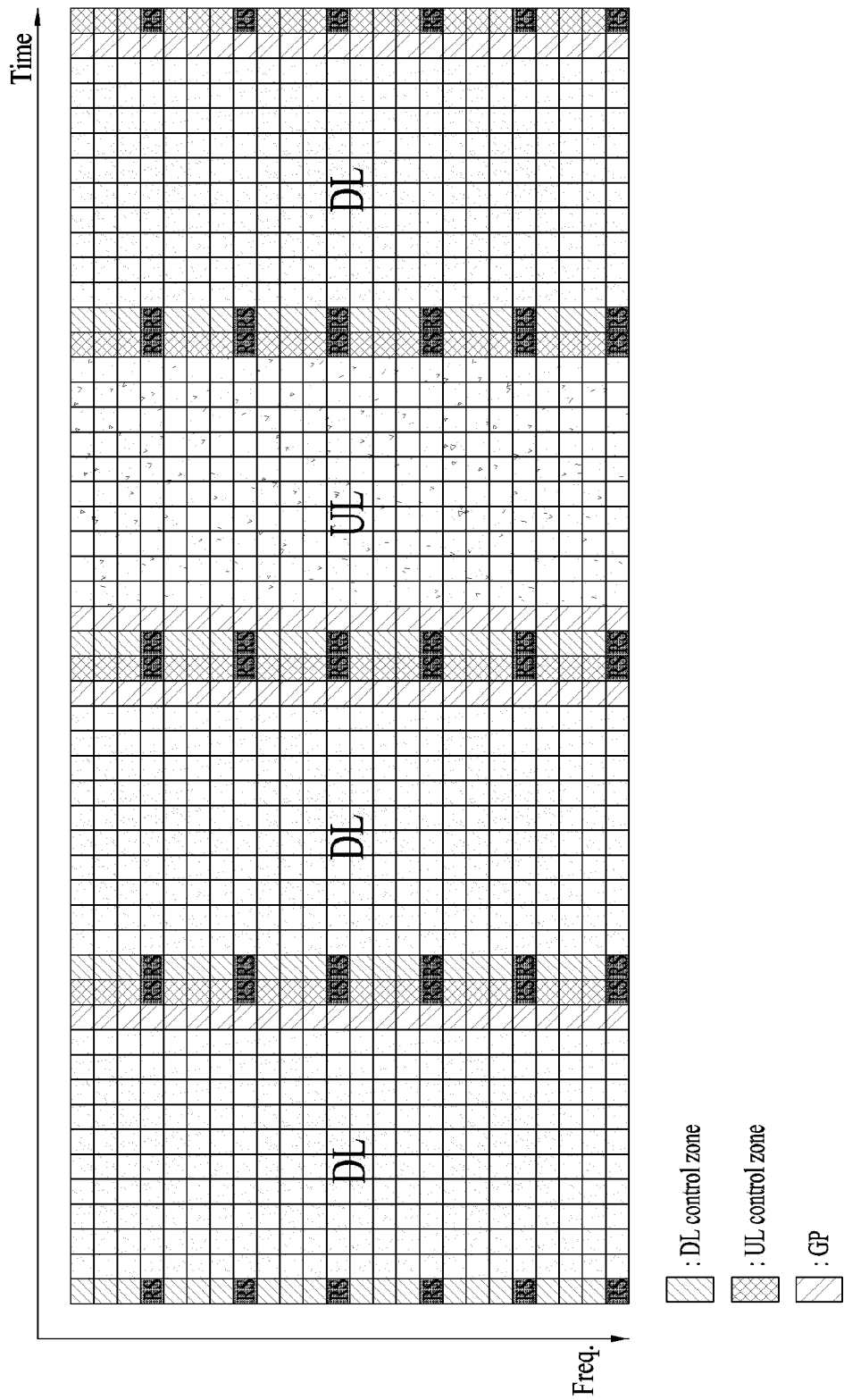
FIG. 12 is a diagram illustrating an example of a frame structure time-frequency resource on a TDD carrier.

FIG. 12 is a diagram illustrating an example of a frame structure time-frequency resource on a TDD carrier.

As shown in FIG. 12, a data zone of every subframe is allocated as a UL data zone or a DL data zone. Hence, DL/UL flexibility is lowered compared to the frame structure of the proposal 1. Yet, since the DL control zone and the UL control zone are still located within a single subframe, 'OTA (w/initiation)<1 ms' can be achieved by a scheduler. Moreover, since it is able to utilize the data zone as a DL data zone or a UL data zone by the scheduler, it is apparent that the frame structure is more DL/UL flexible compared to the legacy LTE TDD.

A length of a GP is configured by a multiple of a symbol length. This makes numerology (subcarrier spacing, CP length, symbol length, number of symbols in a TTI) used in TDD to be identically used in a FDD frame structure. In particular, it is a design method for providing commonality as much as possible in the TDD and FDD frame structures. As a result, it may be able to maintain a lot of common parts in a baseband operation.

For example, when a GP is designed by a length of half symbol without being maintained by the length of one symbol, if the same TTI is applied, the number of symbols or a CP length varies in TDD and FDD and it breaks unity in terms of an implementation device. As a result, it may implement TDD and FDD, respectively. On the contrary, if a GP length is maintained by a multiple of a symbol length, since it is able to commonly use a CP, a symbol length, and the like, it may have an advantage that a commonly used implementation part increases.

Proposal 2-2

Figure 13:
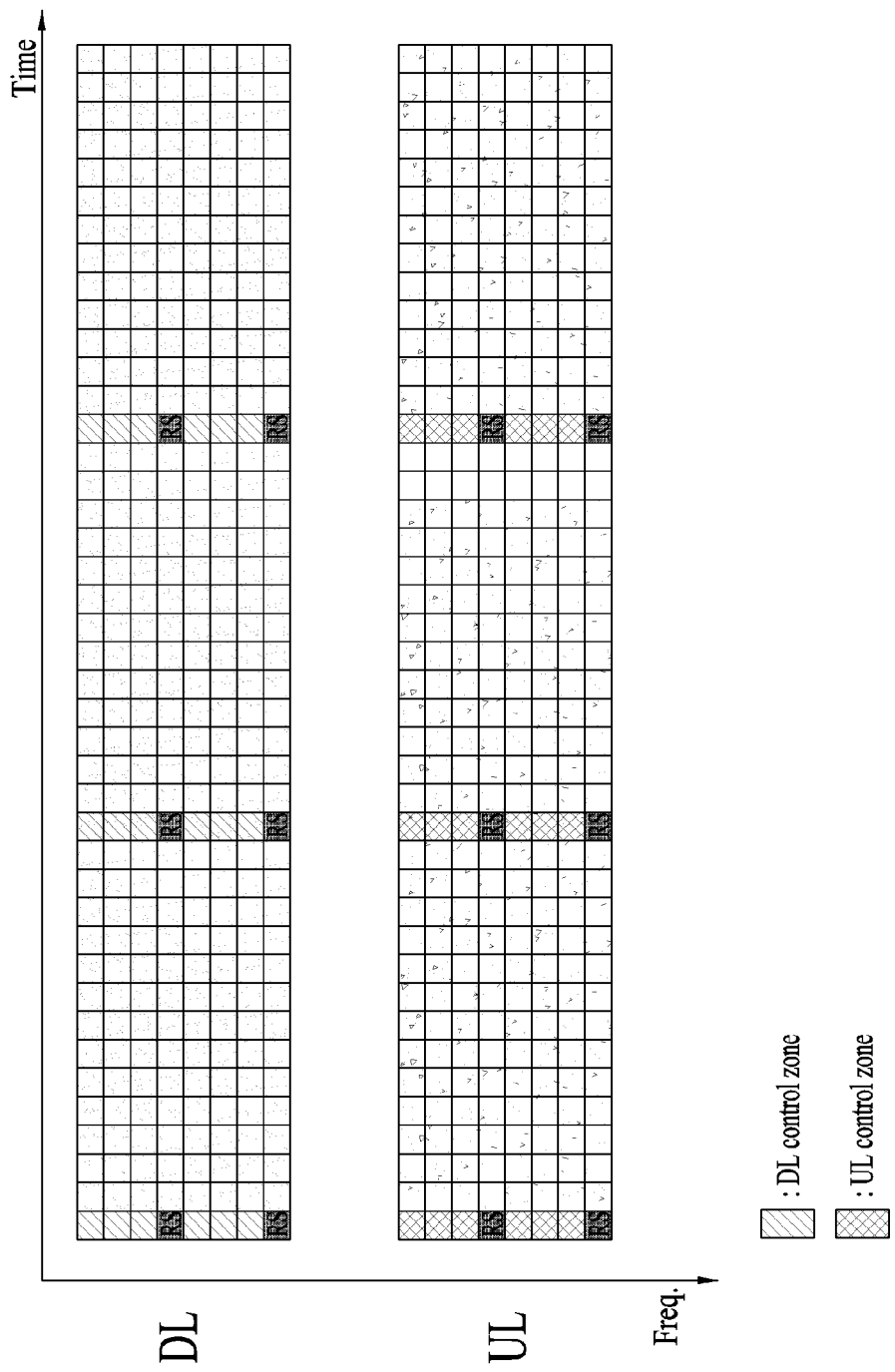
FIG. 13 is a diagram illustrating an example of a frame structure time-frequency resource on a FDD carrier.

FIG. 13 is a diagram illustrating an example of a frame structure time-frequency resource on a FDD carrier.

In FIG. 13, a subframe is mainly divided into a control zone and a data zone on a FDD carrier. In case of DL, the control zone is located at the first of the subframe and the data zone is located after the control zone. In case of UL, a UL control zone is located at the first of the subframe and the data zone is located after the UL control zone.

FIG. 13 illustrates a frame structure that a GP is utilized as a data and a control zone is located at the first part of a subframe in a legacy TDD frame structure. As mentioned in the foregoing description, commonality is maximized by maintaining a common part with the legacy TDD frame structure as much as possible.

As mentioned in the foregoing description, the frame structure according to the proposal provided by the present invention can achieve low latency (i.e., OTA (w/initiation)

<1 ms) corresponding to 5G service requirement and provide DL/UL flexibility capable of efficiently supporting asymmetry of DL/UL traffic as much as possible.

In order to support mobility 500 Km/h corresponding to 5G New RAT system requirement in a self-contained subframe structure, subcarrier spacing increases and TTI decreases to achieve low latency (i.e., OTA (w/initiation)<1 ms) corresponding to 5G service requirement. For example, assume that the subcarrier spacing increases to 75 kHz and the TTI decreases to 0.2 ms. Then, coherence time is reduced to (Tc=1/(2 fd)≈0.18 ms and the coherence time is maintained by a single reference symbol (hereinafter, RS) within 0.2 ms TTI. On the contrary, since maximum r.m.s channel delay spread is maintained by 991 ns and a coherence bandwidth is maintained by (Bc_90%=20 kHz, Bc_50%) =200 kHz, spacing between two RSs should be maintained by 90 kH.

Hence, it is necessary to allocate an RS to the whole band to estimate a channel. In particular, it is necessary to allocate an RS for demodulating a control channel to the whole band of a resource to which the control channel is assigned. And, it is necessary to allocate an RS for demodulating a data channel to the whole band of a resource to which the control channel is assigned. Or, if a specific band is scheduled only, the RS can be allocated to a specific band only.

A self-contained subframe includes 3 channels (a DL control channel, a data channel, and a UL control channel) in total. It is necessary to allocate RSs for the 3 channels. In this case, the RSs can be allocated to at least 3 or more symbols. If it is assumed that the self-contained subframe is configured by 14 symbols in total, since RSs are allocated to 3 or more symbols for the 3 channels, resource overhead of 3/14 occurs. Hence, it is necessary to have a method of improving the resource overhead.

Proposal 3: Method of Reducing RS Overhead in Self-contained Subframe Structure

As a solution for the proposal 3, the present invention proposes a method of using RSs for estimating or demodulating a control channel and a data channel in the same resource region in a manner of overlapping the RSs in the resource region.

Figure 14A:
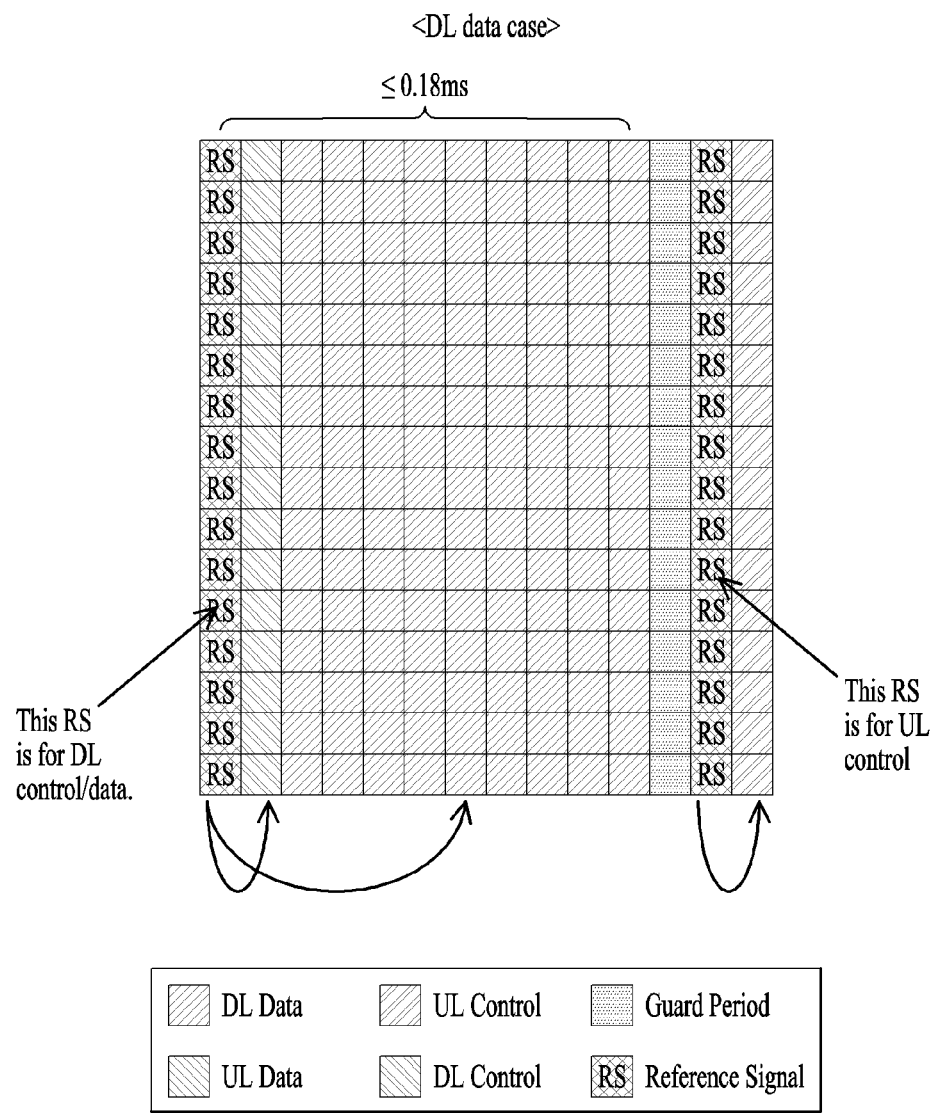
FIG. 14a is a diagram for an example of an RS assignment pattern when a resource region for DL/UL flexibility is allocated via a DL data channel in a self-contained subframe and FIG. 14b is a diagram for an example of an RS assignment pattern when a resource region for DL/UL flexibility is allocated via a UL data channel in a self-contained subframe.
Figure 14B:
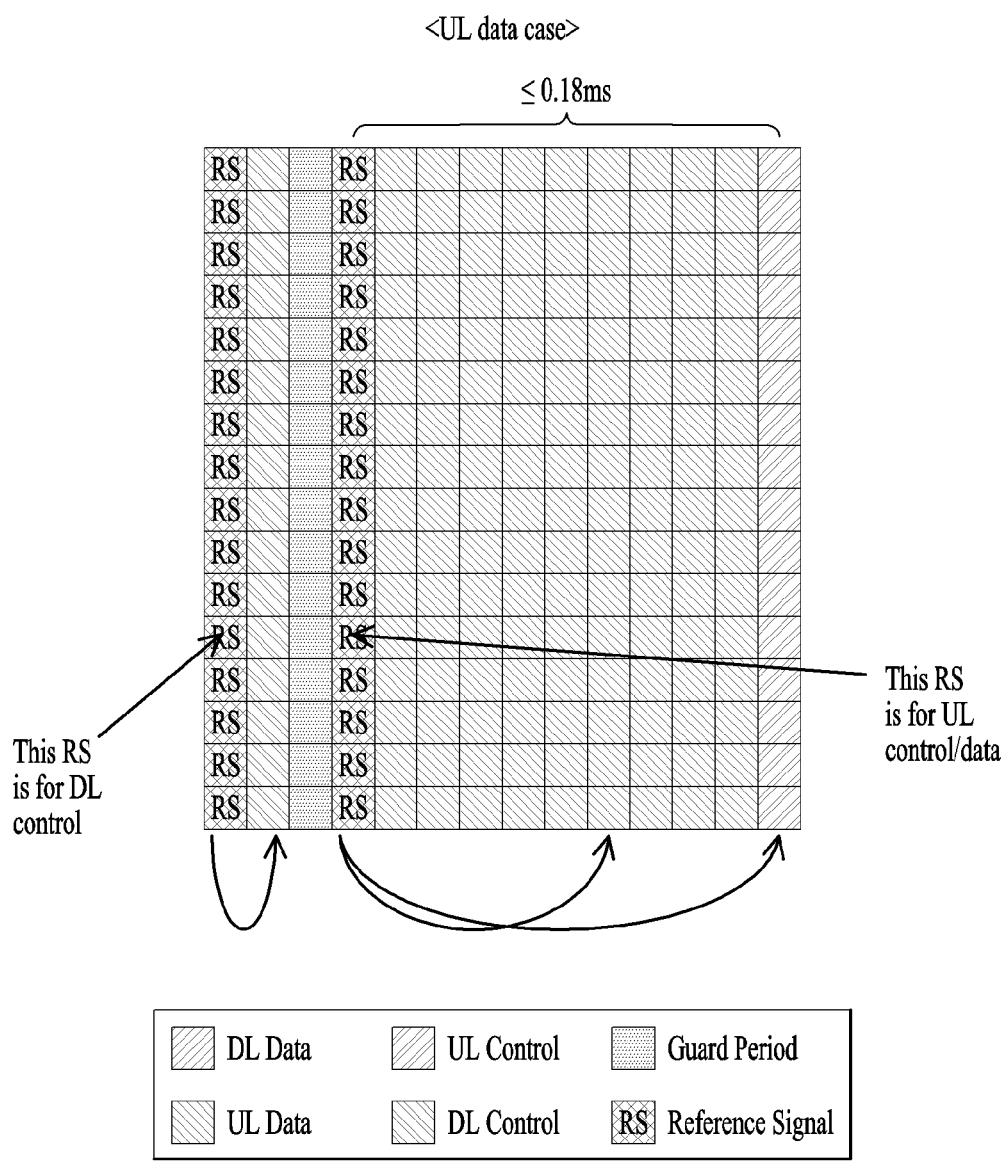

FIG. 14a is a diagram for an example of an RS assignment pattern when a resource region for DL/UL flexibility is allocated via a DL data channel in a self-contained subframe and FIG. 14b is a diagram for an example of an RS assignment pattern when a resource region for DL/UL flexibility is allocated via a UL data channel in a self-contained subframe.

FIG. 14a illustrates a frame structure when a data region corresponds to a DL data region. FIG. 14b illustrates a frame structure when a data region corresponds to a UL data region.

Referring to FIG. 14a, a first symbol and a second symbol of a subframe can be configured as a DL control region. And, an RS for coherently demodulating DL control information can be assigned to the first symbol. In this case, the RS for coherently demodulating the DL control information (or a control channel) and an RS for coherently demodulating DL data are mapped to the first symbol in a manner of being overlapped. And, the last symbol of the subframe is assigned as a UL control region and an RS for coherently demodulating UL control information (or a UL control channel) is located after a GP.

As shown in FIG. 14b, if a data region is allocated as a UL data region, an RS for coherently demodulating DL control information is located at the first symbol of a subframe in a DL control region and an RS for UL data and an RS for UL control information are overlapped at the first part of the UL data region after a GP. FIG. 14b shows an example that an RS for UL data and an RS for UL control information are mapped to a fourth symbol of a subframe in a manner of being overlapped. The RS assignment shown in FIGS. 14a and 14b can reduce RS resource overhead by half compared to a method of making RSs to be located at the control region and the data region, respectively.

In FIGS. 14a and 14b, although RS patterns are overlapped with each other at the first symbol, by which the present invention may be non-limited. For example, as shown in FIGS. 15a and 15b, overlap is available for various patterns and an RS overlap mapping technology is not limited by an RS assignment pattern.

Figure 15A:
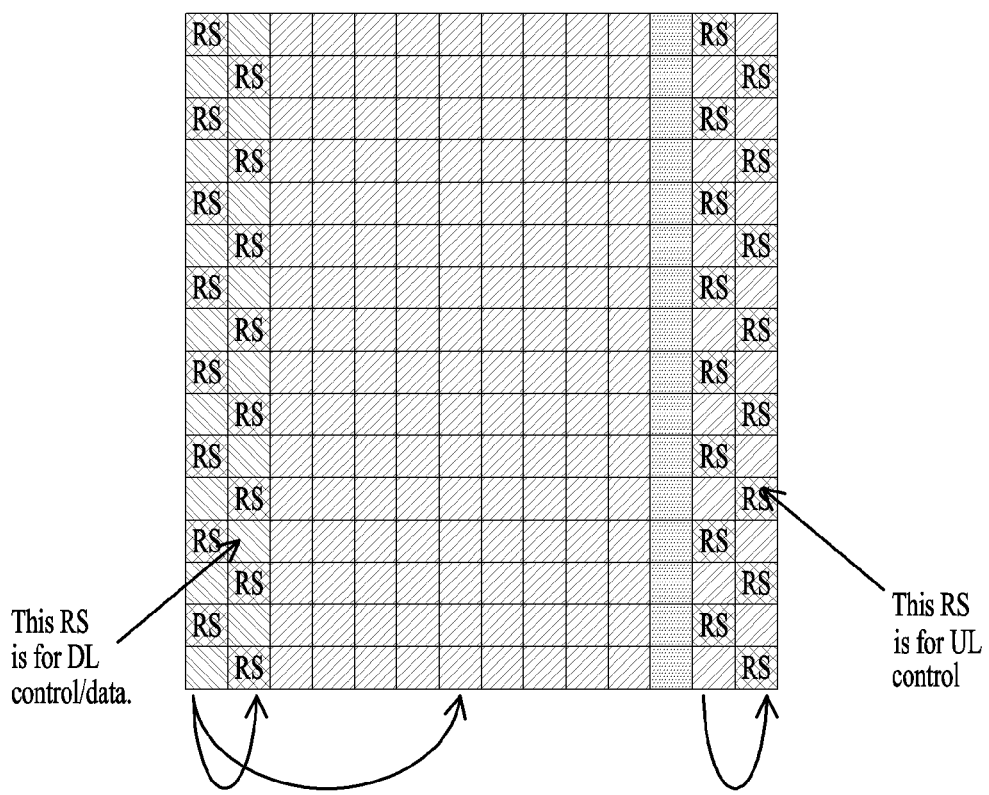
FIG. 15a is a diagram for an example of an RS assignment pattern when a resource region for DL/UL flexibility is allocated via a DL data channel in a self-contained subframe and FIG. 15b is a diagram for an example of an RS assignment pattern when a resource region for DL/UL flexibility is allocated via a UL data channel in a self-contained subframe.
Figure 15A:
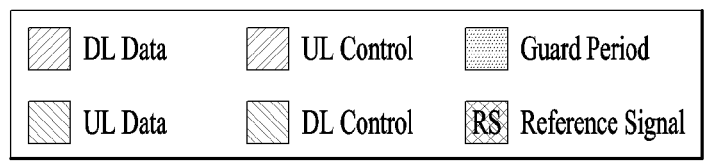
Figure 15B:
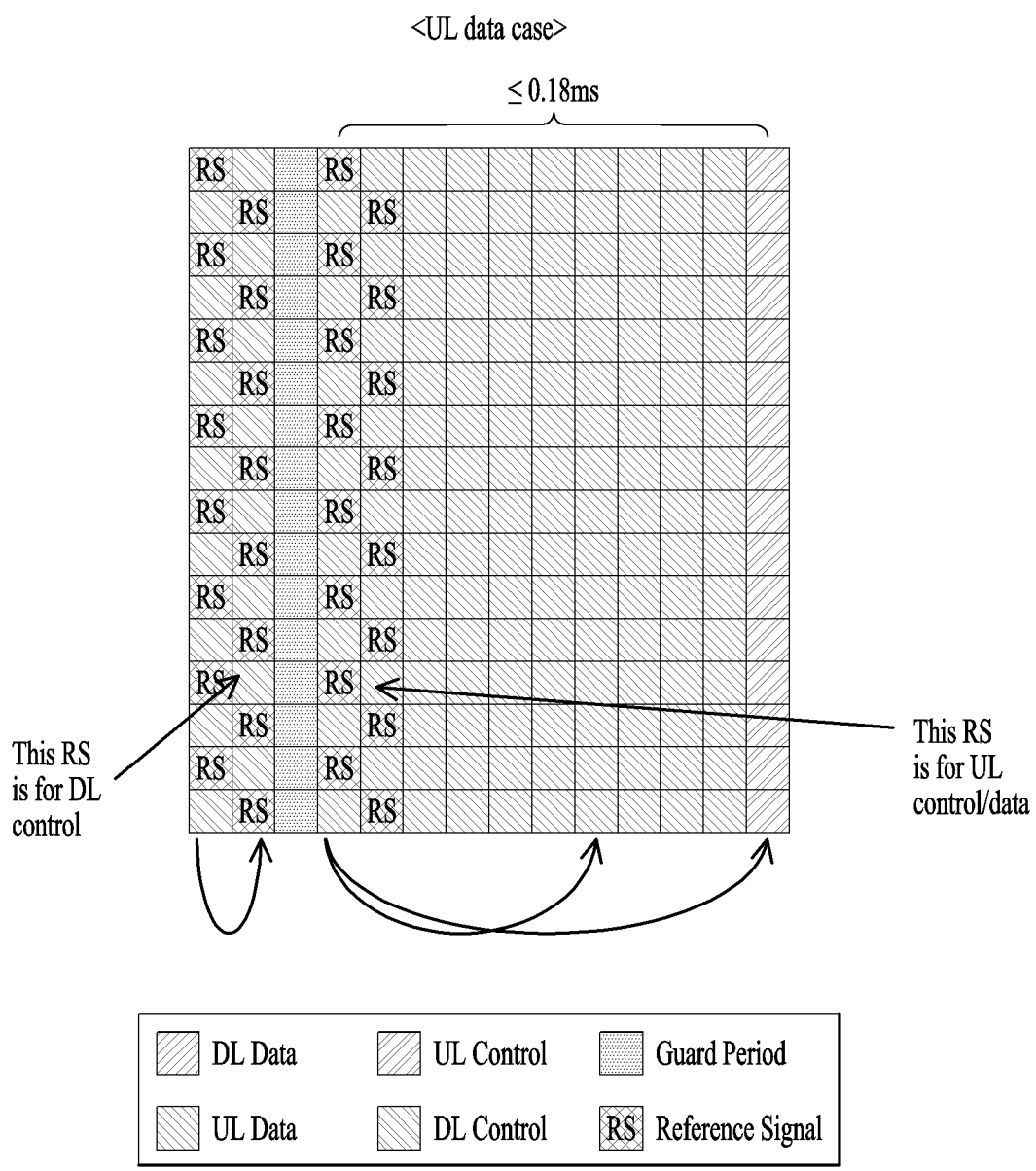

FIG. 15a is a diagram for an example of an RS assignment pattern when a resource region for DL/UL flexibility is allocated via a DL data channel in a self-contained subframe and FIG. 15b is a diagram for an example of an RS assignment pattern when a resource region for DL/UL flexibility is allocated via a UL data channel in a self-contained subframe.

Referring to FIG. 15a, an RS for coherently demodulating DL control information and DL data can be assigned to a first symbol and a second symbol of a subframe assigned as a DL control region and an RS for coherently demodulating UL control information can be assigned to the last two symbols of a subframe assigned as an UL control region. Referring to FIG. 15b, an RS for coherently demodulating DL control information can be assigned to a first symbol and a second symbol of a subframe assigned as a DL control region and an RS for coherently demodulating UL control information and UL data can be assigned to two symbols appearing after a GP.

Moreover, a position of an RS in time domain can be arranged in a manner of being distributed to all time domains of data and control information. In this case, delay may occur when the control information is demodulated.

A procedure for a UE and an eNB to demodulate control information and data is described in the following. First of all, for clarity, an RS for control information and an RS for data are defined as C_RS and D_RS, respectively.

As Shown in FIGS. 14a and 15a, When Data Region is Assigned as DL Data Region (DL Control and DL Data)

eNB Operation

First of all, RE mapping is performed in a manner of generating control information entering into a control channel and C_RS for demodulation. In this case, the C_RS is mapped to an overlapped RS region. After DL data and D_RS for demodulating the DL data are generated, data is mapped to a resource region (or resource block) designated by DL control information. And, the D-RS and a C_RS for a control channel are transmitted to a UE in a manner of being overlapped in an overlapped RS region corresponding to the same frequency domain.

UE Operation

In order to detect DL control information, a UE estimates a channel in an overlapped RS region using C_RS and may be then able to obtain the DL control information using the estimated channel. The UE is able to know whether or not there exist data assigned to the UE based on the obtained DL control information. If there exists data assigned to the UE, the UE performs channel estimation in the overlapped RS region using D_RS for a corresponding frequency domain position. The UE can detect the data assigned to the UE based on the channel estimation using the D_RS.

As Shown in FIGS. 14b and 15b, When Data Region is Assigned as UL Data Region (UL Data and Control)

UE Operation

First of all, assume that an eNB implicitly or explicitly allocates a UL data region and a UL control region to each UE. If both UL data region and UL control region are assigned to a UE, the UE generates data and D_RS, maps the data to an allocated DL data resource region, and maps the D_RS to an overlapped region.

And, the UE generates UL control information and C_RS, maps the UL control information to a UL control region, and maps the C_RS to an overlapped RS region in a manner of overlapping the C_RS with the D-RS.

When UL data is assigned to the UE only, if data is transmitted only, the UE generates D_RS and maps the D_RS to an overlapped RS region assigned to the UE. On the contrary, when UL control information is assigned to the UE only, the UE maps the C-RS to an overlapped RS region corresponding to a region assigned to the UE.

eNB Operation

In order to detect UL control information and UL data of UEs, an eNB performs channel estimation based on C-RS or D_RS at a preassigned position.

When C_RS and D_RS are used in a manner of being overlapped in the same RS region, it is important to secure orthogonality between the RSs in terms of performance. A sequence can be configured in various ways using an orthogonal cover code (OCC), cyclic shift, or the like.

Figure 16:
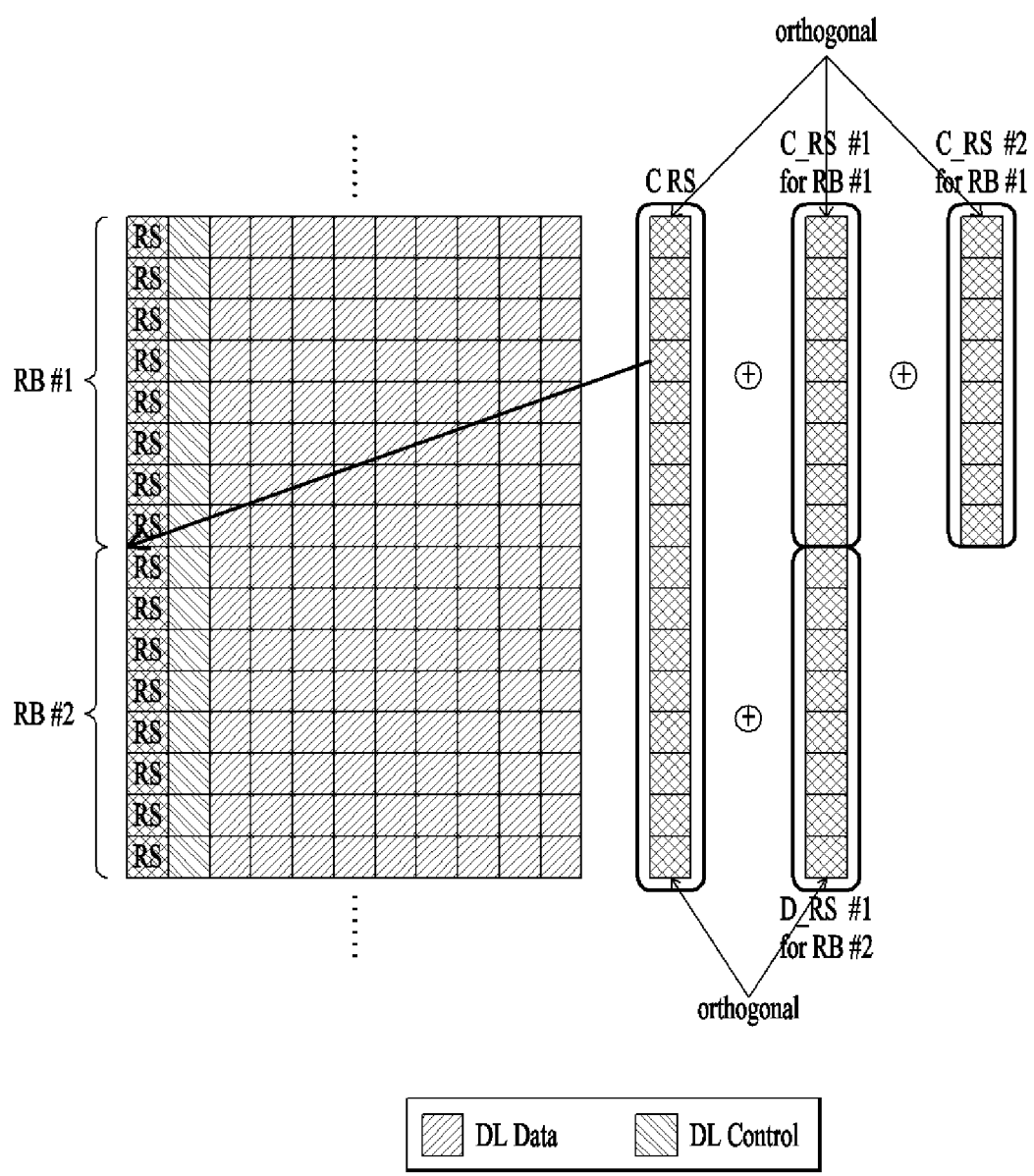
FIG. 16 is a diagram for a method of securing orthogonality between C_RS and D_RS when a data region is allocated to a DL data region in a self-contained subframe structure.

FIG. 16 is a diagram for a method of securing orthogonality between C_RS and D_RS when a data region is allocated to a DL data region in a self-contained subframe structure.

Referring to FIG. 16, two D_RSs (e.g., dual layer (D-RS #1 and D_RS #2)) are assigned to an RB (resource block) #1 and one D_RS is assigned to an RB #2. The total 3 RSs (i.e., C_RS, D_RS #1, and D_RS #2) are mapped in frequency domain of the RB #1 in a manner of being overlapped. In order to secure orthogonality for reception capability, sequences applied to the RSs can be configured to have orthogonal characteristic. For example, if a cyclic shift value is differently configured according to each RS on the basis of a base sequence, it may be able to secure orthogonality in time domain. As a different method, it may be able to secure orthogonality in frequency domain by assigning sequences different from each other that maintain orthogonality in frequency domain.

It may also be able to configure the RB #2 using a cyclic shift or an OCC to secure orthogonality between the C_RS and the D_RS #1. A UE can detect C_RS-based DL control information based on the orthogonality and detect DL data using corresponding D_RS to detect a resource allocated to the UE.

In this case, the number of overlapped RSs may vary depending on the number of layers of actually allocated RBs. And, a length unit of an RS can be extended to a plurality of RBs. In the following, a method of securing orthogonality using a cyclic shift value is explained with reference to FIG. 17 among the methods of securing orthogonality.

Figure 17:
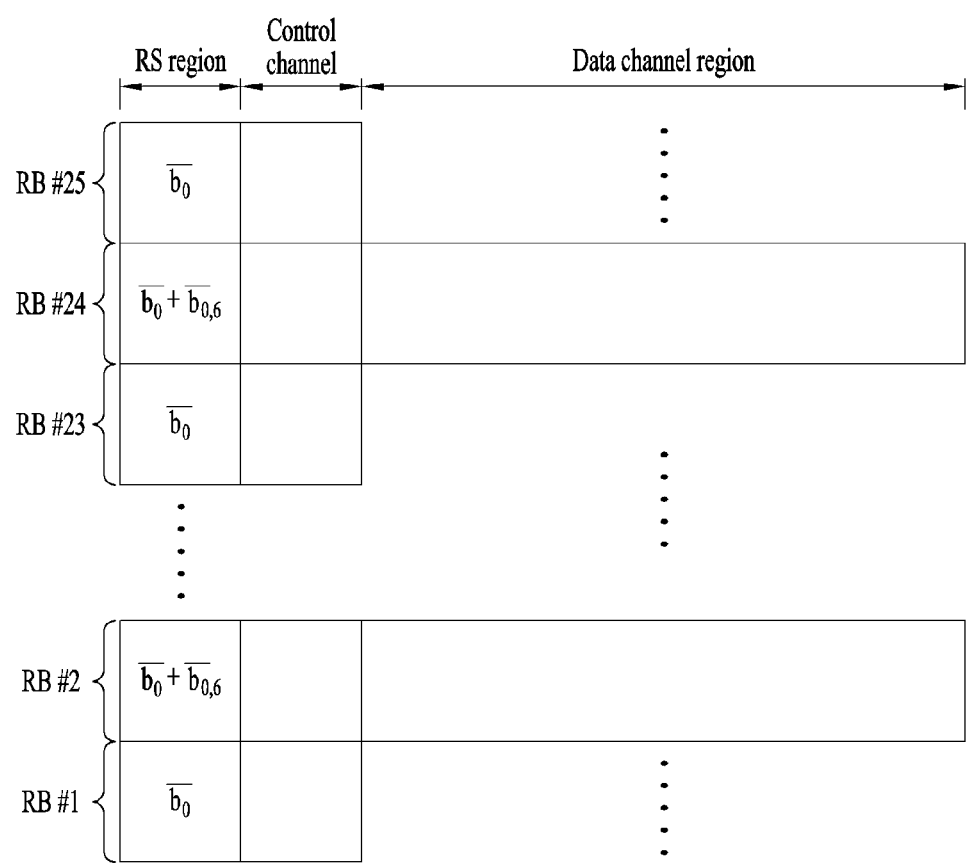
FIG. 17 is a diagram for explaining a case that a control channel is used for the whole band and a data channel is used for $24^{th}$ RB and $2^{nd}$ RB among 25 RBs in total.

FIG. 17 is a diagram for explaining a case that a control channel is used for the whole band and a data channel is used for 24$^{th}$ RB and 2$^{nd}$ RB among 25 RBs in total.

C_RS can be transmitted on the whole band of a resource to which a DL control channel is assigned. D_RS is mapped to a region to which the C_RS is mapped. The D_RS and the C_RS can be overlapped and mapped to a region to which DL data is assigned only (In FIG. 17, 2$^{nd}$ and 24$^{th}$ RBs only).

FIG. 17 shows a method of configuring a sequence using a base sequence and cyclic shift (CS) according to an RB.

For clarity, assume that a base sequence to which CS is to be applied and a sequence to which a cyclic shift value m is applied are defined as $\overline{b_0}$ and $\overline{b_{0,m}}$, respectively. And, assume that a symbol length and the number of subcarriers per RB correspond to $N_{sym}$ and $N_{sc}$, respectively. Hence, it may be able to secure orthogonality in time domain in a manner of applying a CS values ranging from 0 to maximum $N_{sc}-1$.

As shown in FIG. 17, a base sequence $\overline{b0}$ is applied to all RBs of C_RS and a CS value as much as 6 is applied to an RB index 24 and an RB index 2 to which data is assigned. The C_RS for demodulating a DL control channel can estimate a channel using a base sequence. In particular, since a channel impulse response is located at a part corresponding to a first $1/N_{sc}$ of the total symbol length $N_{sym}$ in time domain in every RB, it may be able to estimate a DL control channel using the part.

If a UE is able to know positions of assigned data through a DL control channel and the positions correspond to an RB index 2 and an RB index 24, since a channel impulse response is located at a part corresponding to $6/N_{sc} \sim 7/N_{sc}$ of the total symbol length $N_{sym}$ in time domain, the UE is able to estimate a data channel using the part.

In this case, a size of a time window and an applied CS value (i.e., 6) can be applied using various values. For example, if the CS value is restricted to values including 0, 2, 4, ..., $N_{sc}-2$, a region at which a channel impulse response is located can be increased to $2N_{sym}/N_{sc}$. And, a configuration of the value can be determined according to a channel delay spread value. And, when a channel delay spread value is big, if a value farthest from a base value 0 is selected as a CS value, it may be able to prevent a channel impulse response from being overlapped.

Hence, an eNB can inform a UE of a unit of increasing a CS value through higher layer signaling (e.g., RRC signal). And, the eNB can transmit a CS value applied to data to the UE in a manner of including the CS value in DCI (downlink control information). And, the method can also be extensively applied to RBG (resource block group).

As a method of determining a cyclic shift value, a CS value of C_RS and a CS value of D_RS can be configured to have a maximum space. Simultaneously, a space between C_RSs and a space between D_RSs can be configured to have a maximum space to more secure orthogonality.

Table 1 in the following shows an example when an RB reference $N_{SC}$ corresponds to 12.

TABLE 1

| # of layers of C_RS (or # of antenna ports) | # of layers of D_RS (or # of antenna ports) | CS values for C_RS | CS values for D_RS |
| --- | --- | --- | --- |
| 1 | 1 | 0 | 6 |
| 1 | 2 | 0 | {4, 8} |
| 1 | 4 | 0 | {4, 6, 8, 10} |
| 2 | 2 | {0, 6} | {3, 9} |
| 2 | 4 | {0, 6} | {2, 4, 8, 10} |
| 4 | 1 | {0, 2, 4, 8} | 10 |
| 4 | 2 | {0, 2, 6, 10} | {4, 8} |
| 4 | 8 | {0, 3, 6, 9} | {1, 2, 4, 5, 7, 8, 10, 11} |

As a method of determining a base sequence applied to C_RS and D_RS, a base sequence can be determined based on a cell ID or a subframe index to randomize inter-cell interference. UL data can also be configured by a method identical to a method of configuring DL data.

According to one embodiment of the present invention, it is able to reduce waste of an RS resource for detecting a data channel and a control channel in a self-contained frame structure and reduce decoding latency.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting and receiving a reference signal in a wireless communication system and an apparatus therefor can be applied to various wireless communication systems including 3GPP LTE/LTE-A, 5G system, and the like.

What is claimed is:

1. A method for transmitting a reference signal by a transmitting side in a wireless communication system using a time-frequency resource, the method comprising:
    obtaining:
        first reference signals for demodulating a downlink control channel,
        second reference signals for demodulating a downlink data channel,
        third reference signals for demodulating an uplink control channel, and
        fourth reference signals for demodulating an uplink data channel,
    wherein the time-frequency resource comprises a plurality of resource blocks in a frequency domain, the time-frequency resource comprises a plurality of subframes in a time domain,
    wherein a time interval of each resource block is same as a time interval of one subframe,
    wherein each resource block is one of a downlink resource or an uplink resource,
    wherein the downlink resource comprises a first downlink control channel, a first downlink data channel, a first guard period and a first uplink control channel, and
    wherein the uplink resource comprises a second downlink control channel, a second guard period, a second uplink control channel, a second uplink data channel and a third uplink control channel;
    mapping the first reference signals and the second reference signals to the first downlink control channel being assigned by overlapping the first reference signals and the second reference signals in case of the downlink resource,
    wherein the third reference signals are mapped to the first uplink control channel in case of the downlink resource;
    mapping the first reference signals to the second downlink control channel in case of the uplink resource,
    wherein the third reference signals and fourth reference signals are mapped to the second uplink control channel being assigned by overlapping the third reference signals and the fourth reference signals in case of the uplink resource;
    transmitting the first downlink control channel and the first downlink data channel in case of the downlink resource and receiving the first uplink control channel in case of the downlink resource; and
    transmitting the second downlink control channel in case of the uplink resource and receiving the second uplink control channel, the second uplink data channel and the third uplink control channel in case of the uplink resource.

2. The method of claim 1, wherein predefined cyclic shift values are applied to the first reference signals, the second reference signals, the third reference signals and the fourth reference signals.

3. The method of claim 2,
    wherein different cyclic shift values are applied to the first reference signals and the second reference signals, and
    wherein other different cyclic shift values are applied to the third reference signals and the fourth reference signals.

4. The method of claim 1,
    wherein, when two values have a greatest difference in predefined cyclic shift values, one of the two values is applied to the first reference signals and another of the two values is applied to the second reference signals, and
    wherein, when other two values have a greatest difference in predefined cyclic shift values, one of the other two values is applied to the third reference signals and another of the other two values is applied to the fourth reference signals.

5. The method of claim 1,
    wherein the first reference signals are assigned to a first symbol which is included in the first control channel or a first symbol which is included in the second control channel,
    wherein the second reference signals are assigned to the first symbol which is included in the first control channel,
    wherein the fourth reference signals are assigned to a fourth symbol which is included in the second uplink control channel, and
    wherein the third reference signals are assigned to the fourth symbol which is included in the second uplink control channel or an immediately preceding symbol of a last symbol which is included in the first uplink control channel.

6. The method of claim 1, wherein the mapping further comprises mapping the first reference signals to whole band of the first symbol which is included in the first control channel or the first symbol which is included in the second control channel.

7. A method for receiving a reference signal by a receiving side in a wireless communication system using a time-frequency resource, the method comprising:

obtaining:
first reference signals for demodulating a downlink control channel,
second reference signals for demodulating a downlink data channel,
third reference signals for demodulating an uplink control channel, and
fourth reference signals for demodulating an uplink data channel,
wherein the time-frequency resource comprises a plurality of resource blocks in a frequency domain, the time-frequency resource comprises a plurality of subframes in a time domain,
wherein a time interval of each resource block is same as a time interval of one subframe,
wherein each resource block is one of a downlink resource or an uplink resource,
wherein the downlink resource comprises a first downlink control channel, a first downlink data channel, a first guard period and a first uplink control channel, and
wherein the uplink resource comprises a second downlink control channel, a second guard period, a second uplink control channel, a second uplink data channel and a third uplink control channel;
mapping the third reference signals to the first uplink control channel in the case of the downlink resource,
wherein the first reference signals and the second reference signals are mapped to the first downlink control channel being assigned by overlapping the first reference signals and the second reference signals in case of the downlink resource;
mapping the third reference signals and fourth reference signals to the second uplink control channel being assigned by overlapping the third reference signals and the fourth reference signals in case of the uplink resource,
wherein the first reference signals are mapped to the second downlink control channel in case of the uplink resource,
receiving the first downlink control channel and the first downlink data channel in case of a downlink resource and transmitting a first uplink control channel in case of the downlink resource;
receiving the second downlink control channel in case of the uplink resource and transmitting the second uplink control channel, the second uplink data channel and the third uplink control channel in case of the uplink resource;
detecting downlink control information using the first reference signals; and
detecting data using the downlink control information and the second reference signals.

8. The method of claim 7, wherein the first reference signals are received in a manner of being mapped to a whole band of the first symbol which is included in the first control channel or the first symbol which is included in the second control channel.

9. The method of claim 7, wherein predefined cyclic shift values are applied to the first reference signals, the second reference signals, the third reference signals and the fourth reference signals.

10. The method of claim 9,
wherein different cyclic shift values are applied to the first reference signals and the second reference signals, and
wherein other different cyclic shift values are applied to the third reference signals and the fourth reference signals.

11. The method of claim 7,
wherein, when two values have a greatest difference among predefined cyclic shift values, one of the two values is applied to the first reference signals and another of the two values is applied to the second reference signals, and
wherein, when other two values have a greatest difference in predefined cyclic shift values, one of the other two values is applied to the third reference signals and another of the other two values is applied to the fourth reference signals.

12. The method of claim 7,
wherein the first reference signals are assigned to a first symbol which is included in the first control channel or a first symbol which is included in the second control channel,
wherein the second reference signals are assigned to the first symbol which is included in the first control channel,
wherein the fourth reference signals are assigned to a fourth symbol which is included in the second uplink control channel, and
wherein the third reference signals are assigned to the fourth symbol which is included in the second uplink control channel or an immediately preceding symbol of a last symbol which is included in the first uplink control channel.

13. A transmitting apparatus for transmitting a reference signal in a wireless communication system using a time-frequency resource, comprising:
a transceiver coupled to a processor; and
the processor configured to:
obtain:
first reference signals for demodulating a control downlink channel,
second reference signals for demodulating a downlink data channel,
third reference signals for demodulating an uplink control channel, and
fourth reference signals for demodulating an uplink data channel,
wherein the time-frequency resource comprises a plurality of resource blocks in a frequency domain, the time-frequency resource comprises a plurality of subframes in a time domain,
wherein a time interval of each resource block is same as a time interval of one subframe,
wherein each resource block is one of a downlink resource or an uplink resource,
wherein the downlink resource comprises a first downlink control channel, a first downlink data channel, a first guard period and a first uplink control channel, and
wherein the uplink resource comprises a second downlink control channel, a second guard period, a second uplink control channel, a second uplink data channel and a third uplink control channel,
map the first reference signals and the second reference signals to the first downlink control channel being assigned by overlapping the first reference signals and the second reference signals in case of the downlink resource,
wherein the third reference signals are mapped to the first uplink control channel in case of the downlink resource,
map the first reference signals to the second downlink control channel in case of the uplink resource, wherein the third reference signals and fourth reference signals are mapped to the second uplink control channel being assigned by overlapping the third reference signals and the fourth reference signals in case of the uplink resource,
transmit the first downlink control channel and the first downlink data channel in case of the downlink resource and receive the first uplink control channel in case of the downlink resource, and
transmit the second downlink control channel in case of the uplink resource and receive the second uplink control channel, the second uplink data channel and the third uplink control channel in case of the uplink resource.

14. A receiving apparatus for receiving a reference signal in a wireless communication system using a time-frequency resource, comprising:
a transceiver coupled to a processor; and
the processor configured to:
obtain:
first reference signals for demodulating a downlink control channel,
second reference signals for demodulating a downlink data channel,
third reference signals for demodulating an uplink control channel, and
fourth reference signals for demodulating an uplink data channel,
wherein the time-frequency resource comprises a plurality of resource blocks in a frequency domain, the time-frequency resource comprises a plurality of subframes in a time domain,
wherein a time interval of each resource block is same as a time interval of one subframe,
wherein each resource block is one of a downlink resource or an uplink resource,
wherein the downlink resource comprises a first downlink control channel, a first downlink data channel, a first guard period and a first uplink control channel, and
wherein the uplink resource comprises a second downlink control channel, a second guard period, a second uplink control channel, a second uplink data channel and a third uplink control channel,
receive the first downlink control channel and a first downlink data channel in case of the downlink resource and transmit a first uplink control channel in case of the downlink resource,
receive a second downlink control channel in case of the uplink resource and transmit a second uplink control channel, a second uplink data channel and a third uplink control channel in case of the uplink resource,
detect downlink control information using the first reference signals, and
detect data using the downlink control information and the second reference signals.

\* \* \* \* \*